United States Patent [19]

Johansen

[11] 3,964,237

[45] June 22, 1976

[54] APPARATUS FOR THE PRODUCTION OF A PRODUCT FILLED CONTAINER

[75] Inventor: Poul Egon Johansen, West Hill, Canada

[73] Assignee: Portion Packaging Limited, Rexdale, Canada

[22] Filed: Jan. 24, 1975

[21] Appl. No.: 543,977

Related U.S. Application Data

[63] Continuation-in-part of Ser. No. 357,785, May 7, 1973, abandoned.

[30] Foreign Application Priority Data

May 10, 1972 United Kingdom............... 21976/72

[52] U.S. Cl................................ 53/141; 53/184 R; 425/388; 425/397; 425/400; 425/DIG. 201
[51] Int. Cl.²..................... B65B 3/02; B65B 47/02; B65B 47/10
[58] Field of Search............... 53/112 A, 141, 184 R, 53/282; 425/297, 305 R, 383, 387 R, 388, 397, 400, DIG. 48, DIG. 207

[56] References Cited
UNITED STATES PATENTS

| | | | |
|---|---|---|---|
| 3,195,284 | 7/1965 | Crane | 53/184 X |
| 3,465,071 | 9/1969 | Edwards | 425/397 X |
| 3,661,489 | 5/1972 | Moore | 425/397 X |
| 3,737,276 | 6/1973 | Hill et al. | 425/388 |
| 3,766,702 | 10/1973 | Meissner et al. | 53/141 X |

*Primary Examiner*—Robert L. Spruill

[57] ABSTRACT

With the view to obviating or mitigating the disadvantages that in processes for the production of containers, for example, product-filled containers, in which processes a substantial proportion of scrap is produced and that the space occupied by a plurality of the containers prior to the product-filling thereof is considerable even if the containers are disposed in stacked relationship, there is provided a process for manufacturing a rimmed container preparatory to the filling and closing thereof from a one piece homogeneous blank, composed entirely of heat formable material containing just the requisite amount of material for forming the rimmed container to be filled, filling rim and an apparatus for performing the process, wherein the process includes the steps of uniformly heating a substantially rigid planar preshaped homogeneous blank of thermo plastic material, out to at least immediately adjacent the portion thereof adapted to form the container rim to a formable state while leaving the outermost periphery portion of the rim rigid, then while holding said rigid outermost peripheral blank portion forming the heated blank portion into a cavity, to produce a container. The invention further involves the heating of the blank to a sterilizing temperature to produce an aseptic container and subsequently filling the container e.g. with a food stuff, and closing same.

15 Claims, 19 Drawing Figures

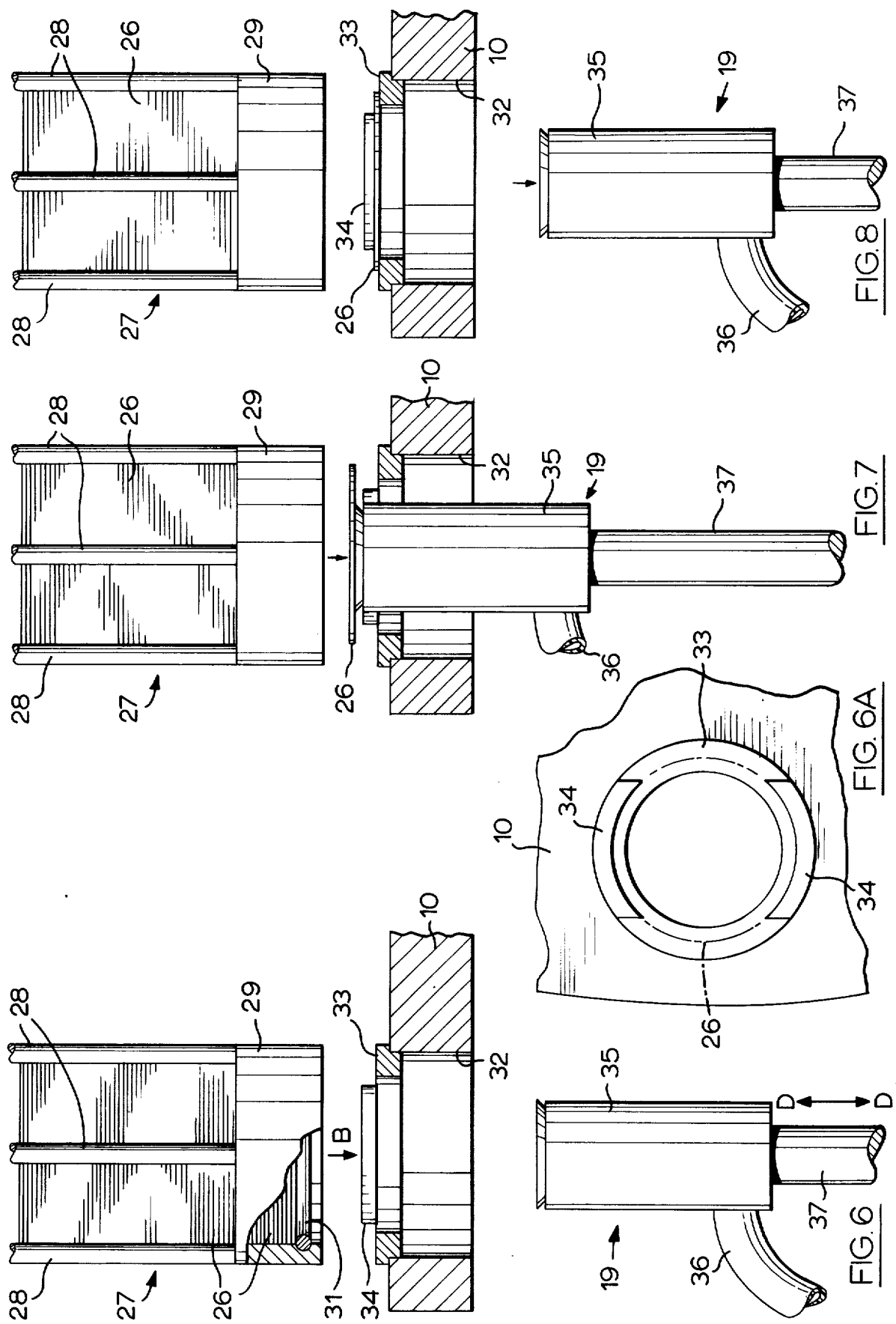

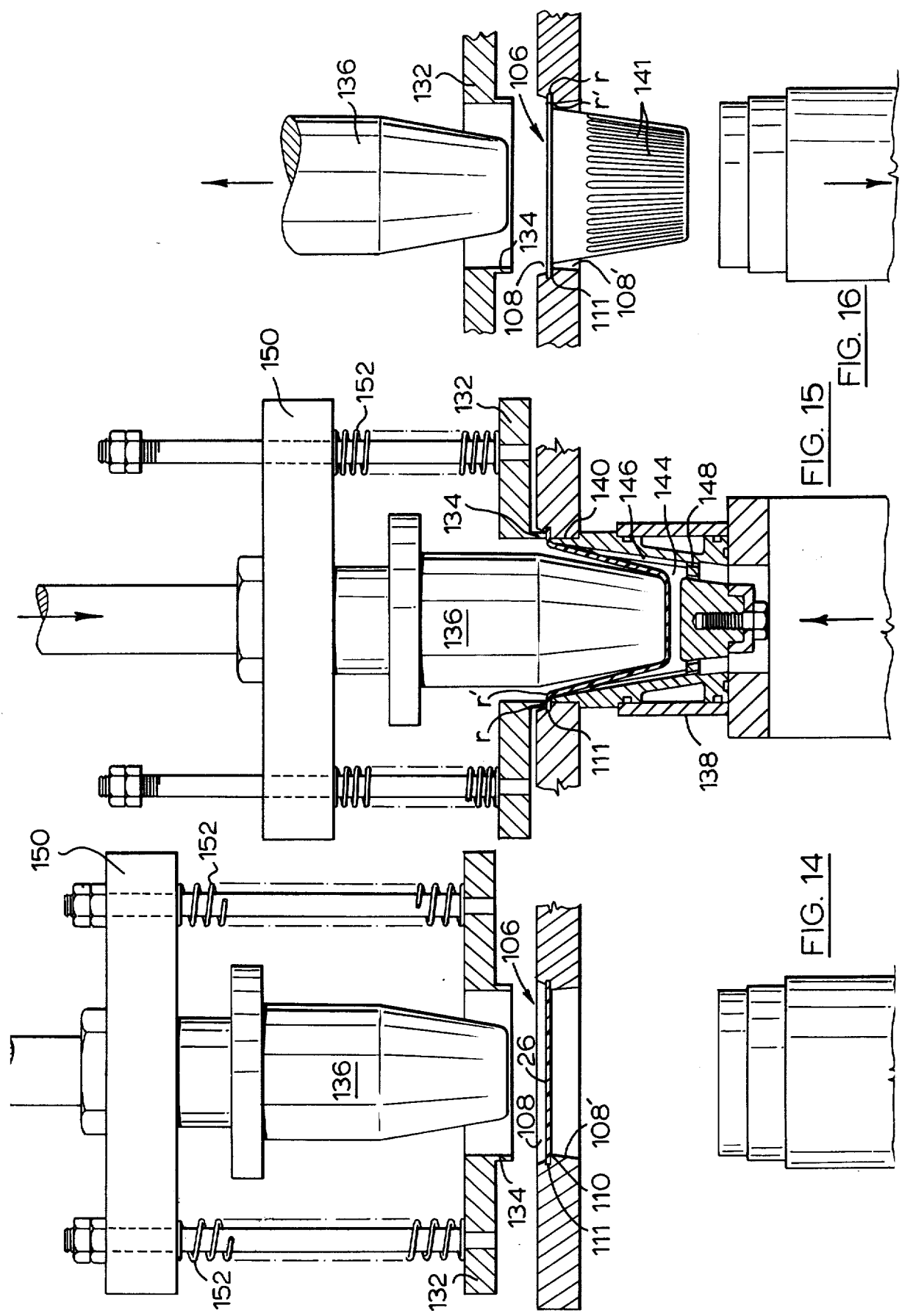

APPARATUS FOR THE PRODUCTION OF A PRODUCT FILLED CONTAINER

This application is a continuation-in-part of U.S. application Ser. No. 357,785 filed May 7, 1973 now abandoned.

This invention is concerned with a process for the production of product-filled containers such as, for example, cup-like containers which are formed of a formable plastics material and which contain, for example, a food product.

It has hitherto been known for the production of product-filled containers to provide a process in which a substantially planar sheet of heat formable plastics material is formed, by appropriate deformation of the sheet, with a plurality of cup-like depressions disposed in spaced, side-by-side relationship, the sheet then being transferred to a location at which an appropriate product such as, for example, a food product is dispensed into the cup-like depressions in the sheet. Thereafter, a closure sheet is secured to the sheet in which the cup-like depressions or cavities, are formed, whereby to cover each of these depressions, and finally the composite layer consisting of the closure sheet and the sheet in which the cup-like depressions are formed is so cut, for example in a stamping operation, as to separate from this composite layer the individual cup-like depressions together with the attached portions of the closure sheet. Thus, the process results in the production of product-filled containers which are of cup-like form and each of which is covered by a closure lid.

While this hitherto known process is reasonably satisfactory, it suffers from the disadvantage that once the cup-like depressions with the attached portions of the closure sheet have been cut from the composite layer there remains, at least where the cup-like depressions and the attached portions of the closure sheet are of circular form, a proportion of the composite layer which generally constitutes scrap and which may, for example, constitute of the order of 30% of the composite layer. In this connection, the sheet in which the cup-like depressions or cavities are formed and the closure sheet are generally formed of different materials with the result that it is not possible for the above-mentioned remaining proportion of the composite layer to be recycled, and even if it was practicable in this remaining proportion of the composite layer to separate the portion of the closure sheet from the portion of the sheet in which the cup-like depressions were formed for separate recycling of these portions this would not be economically feasible.

In a further process as hitherto known for producing product-filled containers, cup-like depressions are formed in a sheet of heat formable plastics material as in the case of the prior art process hereinbefore described, but these cup-like depressions are then cut from the sheet by, for example, a stamping operation prior to the product in question being dispensed into the cup-like depressions. The individual cup-like depressions which constitute of course cup-like containers are shipped, usually in a stacked condition, to the plant at which the product in question is produced. At this plant the individual containers are withdrawn from the stacked relationship, filled with the product in question, and finally closed by having closure lids secured thereto.

While this further process substantially overcomes the hereinbefore described disadvantage of scrap being produced, since in this latter process the proportion of the sheet of plastics material which remains after the cup-like containers have been cut therefrom may, of course, be recycled, it is a disadvantage of this latter process that the space occupied by any particular number of the containers after these containers have been cut from the sheet of plastics material is considerable, even if the containers are disposed in stacked relationship. Thus, the shipping costs for transporting these containers to the plant at which the product in question is to be dispensed into the containers is relatively high, and in addition a magazine in which these containers are stored for feeding to the apparatus which dispenses the product in question into the individual containers and which subsequently applies the closure lids to the containers is, unless it is of extremely large dimensions, capable of containing only a relatively small number of the containers at a time, with the result that this magazine must be re-stocked at frequent intervals with a consequent increase in the labor costs involved.

It is a primary object of the present invention to provide a process for the production of containers which may be subsequently product-filled and to provide apparatus for performing this process, in which the above-described disadvantages of the hitherto known processes are substantially obviated or mitigated.

According to one aspect of the present invention the process includes the steps of uniformly heating a substantially planar preshaped relatively stiff homogeneous blank of heat formable plastics material to a heat formable temperature out at least adjacent to the periphery thereof, while leaving the outermost peripheral portion which is to constitute at least the outer portion of the rim of the finished container rigid, then while peripherally holding the rigid outer peripheral portion of the heated blank forming a cavity from the central heated portion thereof to form a cup-shaped container having an essentially rigid rim. Following forming of the container, a product is dispensed into the cavity thereof and subsequently a closure is secured to said essentially rigid rim.

Preferably to ensure uniform heating of the blank out to at least adjacent the peripheral rim forming portion of the blank is contacted on both sides with planar heating surfaces which are brought into contact with the opposite sides of the blank under resilient pressure.

Preferably the heated surfaces brought into contact with both sides of the blank are heated to a temperature of the order of 300° to 350°F to raise the heated blank portion to a temperature of the order of about 280°F to render the heated blank portion and subsequently form a cavity free of bacteria so that when same is charged with a food product it constitutes an aseptic container.

Additionally where the draw or depth of the cavity is to be substantial, e.g. of the order of the diameter of the cavity at the rim, a small inner segment of the peripheral portion which is to be clamped in the cavity forming operation is also heated to provide a reservoir of formable material which can be necked down into the cavity to preclude against any discontinuities between its rigid rim and the cavity.

The blank, or tablet-like slip, of formable material may be constituted by any heat formable plastic material such as, for example, styrene polyethylene, or P.V.C. In the various arrangements hereinafter depicted, the blank is shown as a circular disc (e.g. of the order of about 1 ⅝ inch in diameter) for forming a round rimmed cup and it preferably has a minimum thickness of the order of 0.016 to 0.020 inches giving it sufficient inherent stiffness or rigidity for individual handling as a discreet member and for rim stiffness while still affording sufficient material for a cavity depth of the order of the maximum cavity diameter. This thickness may of course be increased particularly for larger containers but for packaging individual quantities of food stuff portions the thickness need not exceed 0.05 inches. In addition to the ability of such thermo plastic blanks to be heat formed it will be understood that the securement of the closure lid to the container subsequent to the dispensing of the product into the container may also be constituted by heat sealing of the closure lid to the container rim.

Also, according to an aspect of the present invention, apparatus for carrying out the above process includes planar heating means for simultaneously contacting and uniformly heating both sides of the substantially planar preshaped homogeneous blank of heat formable plastics material to a heat formable temperature out at least adjacent to the periphery thereof which periphery is to constitute a rim of the formed container means for peripherally clamping the peripheral rim forming portion of said blank and means for forming the heated portion of the blank into a cavity while said peripheral portion is clamped. Preferably, the apparatus also includes a dispenser for dispensing a product into the formed cavity and a closure mechanism for applying and securing a closure lid to the container after the product has been dispensed into the container.

In order that the invention may be more clearly understood and more readily carried into effect the same will now, by way of example, be more fully described with reference to the accompanying drawings of preferred embodiments thereof, in which FIG. 1 is a diagrammatic view of apparatus according to a first preferred embodiment of the present invention;

FIG. 6 is a partially sectioned view, drawn to an enlarged scale, of a portion of the apparatus shown in FIG. 2;

FIG. 6A is a view in the direction of the arrow B in FIG. 6;

FIGS. 7 and 8 are views corresponding to FIG. 6 but showing the portion of the apparatus illustrated therein in different operative conditions;

FIG. 14 is an elevational part sectioned view of the cavity forming elements shown in FIG. 13 in position to form the container cavity.

FIGS. 15 and 16 are views corresponding to FIG. 14 but showing the portion of the apparatus illustrated therein in different operative conditions.

Figure 1:
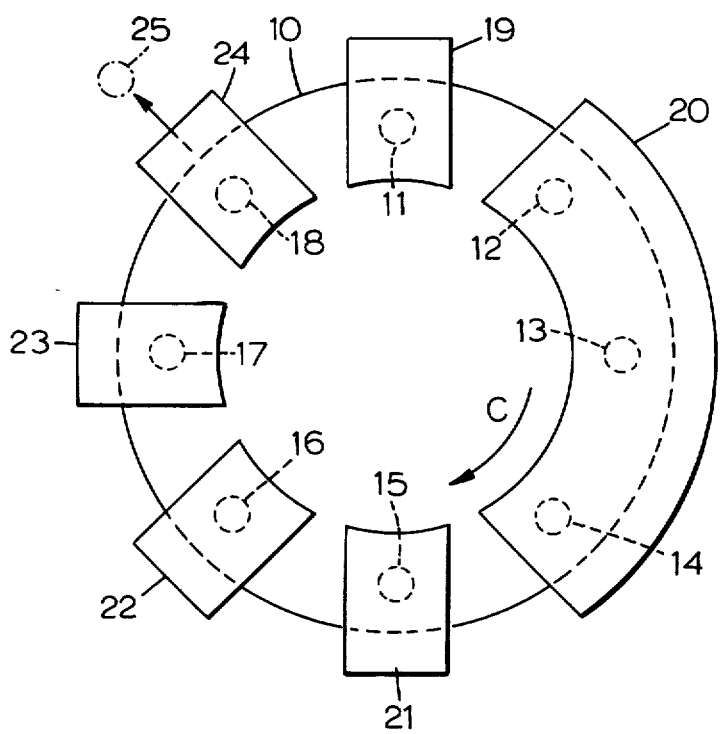

Referring to the drawings and particularly to FIG. 1 thereof, 10 denotes generally a member which is indexably moveable along a continuous path and which is constituted by a turntable rotatably indexable in the direction of the arrow C by power means (not shown), the turntable 10 being so indexable through a plurality of different spaced process stations 11 to 18, inclusive.

19 denotes a pick-up device which operatively serves to supply from a magazine (not shown in FIG. 1) individual, substantially planar homogeneous blanks of heat formable plastics material, such as styrene or polyethylene, to the turntable 10 at the station 11, these blanks being in the form of discs where the cup-like containers to be formed as is hereinafter more fully described are of circular form or discs. 20 denotes generally a heating unit which may comprise a series of electrically heated pads which as each disc of heat formable plastics material is disposed at the stations 12, 13 and 14 are disposed in heat exchange relationship with both sides of the central portion of the disc, such as for example by being disposed in contact with both sides of the central portion of the disc, thereby to heat each central portion to a temperature at which it is formable. While, in one of the preferred embodiments shown in FIG. 1 there are three stations 12, 13 and 14 at which each disc is operatively so heated, it is to be understood that in alternative embodiments of the invention there may be fewer or more than three such stations.

21 denotes a clamping and forming device which serves to clamp a peripheral portion of each disc and form a cavity in the central portion thereof thus forming an individual cup-like container. The forming device may be such as operatively to apply to each disc at the station 15 air pressure, or a vacuum, or a heated plug, or any combination thereof in order to form the disc into the cup-like container. 22 denotes product dispensing means which operatively dispenses a predetermined quantity of the product in question, which may be a food product, into each container as it is disposed at the station 16, the product dispensing means incorporating, if desired, a pump for dispensing the product into the containers. 23 denotes a sealing mechanism for applying a closure lid to each container at the station 17 and for securing as, for example, by heat sealing the closure lid to the container and 24 denotes generally a discharge mechanism by which each product-filled container, with a closure lid secured thereto, is discharged from the turntable 10. Such a product-filled container as it is discharged from the turntable 10 has been shown and is denoted by the reference numeral 25.

The pick-up device 19, the heating unit 20, the clamping and forming device 21, the dispensing means 22, the mechanism 23 and the discharge mechanism 24 are shown in FIG. 1 only in diagrammatic form.

In operation, a first planar homogeneous relatively stiff or rigid disc of heat formable plastics material e.g. having a diameter of the order of 1 ½ inches to 1 ⅝ inches and a thickness of the order of 0.02 inches is supplied by the pick-up device 19 from the magazine (not shown in FIG. 1) to the turntable 10, the disc being disposed and secured on the turntable 10 at the station 11 against movement relative to the turntable. The turntable 10 is then indexed by rotation of the turntable 10 in the direction of the arrow C to move this first disc on the turntable 10 from the station 11 to the station 12 at which heat is applied by the heating unit 20 to both sides of the central portion of this first disc out to at least adjacent the periphery disc portion which is to form the container rim. The subsequent indexing of the turntable 10 in the direction of the arrow C transfers the first disc from the station 12 to the station 13 at which the central portion of the first disc is further heated from both sides by the heating unit 20. Likewise, when the turntable 10 is again indexed the first disc is transferred from the station 13 to the station 14 at which still further heating of the central portion of the first disc from both sides by the heating unit 20 occurs.

The turntable 10 is then indexed to transfer the first disc to the station 15 at which the clamping and forming device 21 operates on the first disc to clamp the unheated peripheral rim forming portion thereof and to deform the heated central portion of this disc into a cavity depending from the rim to produce the desired rimmed container, the container on the next indexing of the turntable 10 being transferred from the station 15 to the station 16 at which the product in question is dispensed into the container. Thereafter, indexing of the turntable 10 transfers the container with the product therein from the station 16 to the station 17 at which a closure lid formed of a plastics material which will generally be different from the plastics material of which the container is formed is applied and secured to the container to cover the container, the container on the next indexing of the turntable 10 being transferred from the station 17 to the station 18 at which it is discharged from the turntable 10 by the discharge mechanism 24. When the turntable 10 is next indexed this results in the portion of the turntable 10 at which the container formed from the first disc was located being returned to the station 11 thereby to complete the cycle, the stations 11 to 18, inclusive, thus being located along a continuous path.

It will, of course, be understood that when the first disc is at the station 12 a second disc is supplied by the pick-up device 19 from the magazine (not shown in FIG. 1) to the turntable 10 at the station 11, when the first disc is disposed at the station 13 the second disc is disposed at the station 12 and a third disc is supplied by the pickup device 19 from the magazine (not shown in FIG. 1) to the turntable 10 at the station 11, and so on.

Figure 2:
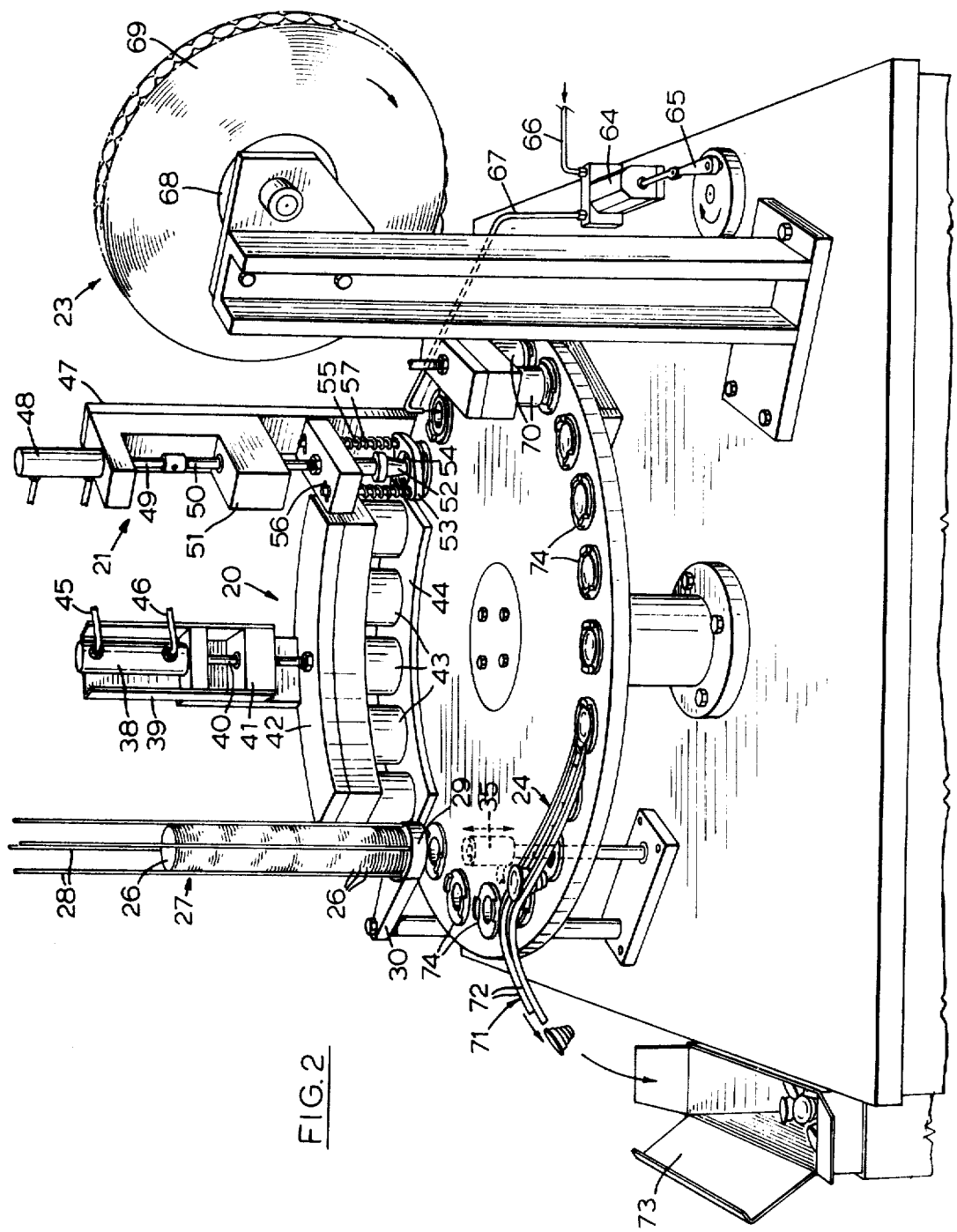
FIG. 2 is a perspective view of one form of apparatus generally according to the first preferred embodiment of the invention shown in FIG. 1.

With particular reference to FIG. 2 which is a perspective view of one form of apparatus generally according to the preferred embodiment hereinbefore described with reference to FIG. 1, the same reference numerals are used in FIG. 2 as in FIG. 1 to denote the corresponding parts of the apparatus.

The magazine from which the individual homogeneous discs 26 of heat formable plastics material are supplied to the turntable 10 is denoted generally by the reference numeral 27 and comprises a plurality of equispaced, vertical guide rods 28 the lower ends of which are secured to a base ring 29 mounted on a support bracket 30, the magazine 27 being disposed in advance of the clamping and forming device 21 relative to the direction of the arrow C denoting the direction of indexable movement of the turntable 10. The discs 26 are stacked vertically between the guide rods 28 and are normally retained by a resiliently deformable member in the form of an O - ring 31 (FIG. 6) which is incorporated in the base ring 29.

Referring to FIGS. 6 and 6A, 32 denotes a through bore provided in the turntable 10, a retainer ring 33 being loosely seated in the upper end portion of the bore 32. This retainer ring 33 presents on the upper face thereof a pair of opposed upwardly projecting arcuate shoulders 34 which are more clearly shown in FIG. 6A.

A pick-up device 19 comprises a vacuum nozzle 35 which is connectible by a flexible pipe 36 to a vacuum pump or other vacuum source (not shown), and which is mounted on a member 37 for operative reciprocation in the direction of the arrows D-D by power means (not shown).

In supplying a disc 26 from the magazine 27 to the turntable 10 at the station 11 the nozzle 35 is operatively raised through the bore 32 by upward movement of the member 37, and the nozzle 35 is connected through the pipe 36 to the source of vacuum thereby to cause the lowermost disc 26 to be withdrawn from the magazine 27. In this connection while the disc 26 is relatively stiff it is capable of a measure of resilient flexing under downward pull of the nozzle 35 and this flexing coupled with the resiliency of the O - Ring 31 (FIG. 6) allows passage of the disc. Thereafter the nozzle 35 is lowered to its initial position by downward movement of the member 37, said disc 26 being, during this movement of the nozzle 35, deposited on the retainer ring 33 between the shoulders 34 which serve positively to position the disc 26 and secure the disc against movement relative to the turntable 10 and the nozzle 35 being disconnected from the source of vacuum (FIG. 8).

The heating unit 20 (FIG. 2) comprises an upper heating assembly comprising a piston and cylinder assembly 38 controlled by air lines 45 and 46, the cylinder of which is fixedly mounted on a support bracket 39 and the piston of which is connected by a piston rod 40 through a guide block 41 to a member 42 which presents a plurality of electrically heated pads 43 of a slightly lesser diameter than the discs for contacting under a degree of resilient pressure and heating the central portion thereof at least out to adjacent the peripheral portion thereof which peripheral portion is adapted to form the rim of the completed container. Similar heating pads (not shown) are arranged to simultaneously contact the underside of the disc up through the ring 33 with the disc being under a degree of pressure between the upper and lower heating pads to ensure uniform heating of the contacted disc portion. The form of the apparatus shown in FIG. 2 differs from the embodiment illustrated in FIG. 1 in that, whereas in the embodiment illustrated in FIG. 1 the major central portion of each disc is heated by the heating unit 20 at three stations, namely, the stations 12, 13 and 14, in the form of the apparatus shown in FIG. 2 the central portion of each disc 26 is so heated by the heating unit 20 at five stations.

44 denotes a fixedly mounted plate immediately beneath which each disc 26 is operatively moved during rotatable indexing of the turntable 10, the lower face of the plate 44 being centrally provided with a longitudinally extending groove (not shown) through which the shoulders 34 operatively freely move while the portions of the lower face of the plate 44 bounding said groove are disposed in substantially slidable contact with the side portions of each disc 26 which project beyond the opening in each ring 33.

It will be understood that the upper heating pads 43 (and corresponding under heating pads) will be brought into contact with the opposite sides of the disc 26 to apply a resilient compressive force thereto to heat same uniformly while the turntable 10 is stationary and will be moved clear of the turntable during the turntable indexing movement.

The heating pads are preferably maintained at a temperature of the order of 300° to 350°F and contact the blank disc for a time sufficient to effectively and uniformly raise the temperature of the central heated portion of the disc 26 to about 280°F at which point this central cavity forming portion of the disc into which a food stuff or the like may be dispensed is rendered sterile or aseptic to protect the dispensed food stuff from degradation under bacterial action.

The clamping and forming device 21 in the embodiment illustrated in FIG. 2 comprise a single unit 21 including a fixedly mounted support stand which is denoted generally by the reference numeral 47. On the upper end of the support stand 47 is fixedly mounted the cylinder of a piston and cylinder assembly 48, the piston of which has a piston rod 49 which is coupled to a piston rod extension 50. Seen best in FIGS. 9, 10 and 11, the lower end of the piston rod extension 50 is connected to a cross member 51 from the underface of which there is presented a downwardly projecting forming device or plug 52 which is operatively electrically heated. The clamping member constituted by a ring 53 is so disposed that the plug 52 may operatively project therethrough, the ring 53 presenting a downwardly projecting annular clamping shoulder 54 which is operatively contactible with the portion of each disc 26 adjacent the periphery thereof which projects beyond the opening in each ring 33 (See FIG. 6A). Vertically disposed guide posts 55 are disposed with the lower ends thereof secured to the ring 53 and with the upper end portions thereof so disposed through apertures provided in the cross member 51 that the cross member 51 may slidably reciprocate relative to the guide posts 55, stop pins 56 being provided through the guide posts 55 thereby to limit upward movement of the cross member 51 relative to the ring 53, and coil compression springs 57 which are disposed around the guide posts 55 acting on the cross member 51 and the ring 53 to urge the ring 53 in the direction away from the cross member 51. The ring 53 is thus, in effect, resiliently mounted on the plug 52.

A body 58 seen best in FIGS. 9, 10 and 11, which is mounted on a rod 59 for vertical reciprocation thereof by power means (not shown) is disposed below the turntable 10 at the station 15, the body 58 having an abutment shoulder provided with a resiliently deformable sealing ring 61, which is adapted to enter into sealing engagement with the lower face of the turntable 10 bounding the bore 32 therein when the upper portion of the body 58 operatively enters into this bore 32 in the turntable 10. The body 58 is provided with a cavity 62 the shape and configuration of which determines the shape and configuration of the cup-like container into which each disc 26 is operatively formed, the cavity 62 being connectible through a flexible pipe 63 with a vacuum pump or other source of vacuum (not shown).

Figure 9:
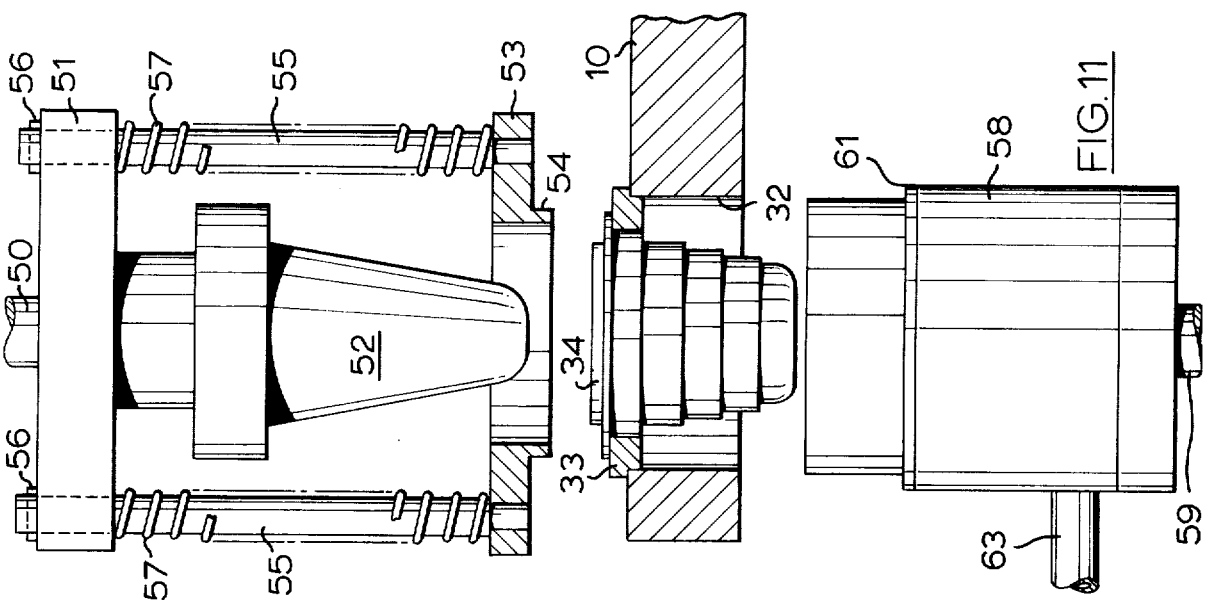
FIG. 9 is a partially sectioned view, drawn to an enlarged scale, of a further portion of the apparatus shown in FIGS. 2.

As each disc 26 is conveyed by rotatable indexing of the turntable 10 to the station 15 the clamping and forming device 21 as hereinbefore described is initially in the condition shown in FIG. 9. The piston and cylinder assembly 48 is then operated to cause downward movement of the electrically heated plug 52 and simultaneously the body 58 is raised until the plug 52 and the body 58 have attained the condition shown in FIG. 10 in which by the above-described relative movement of the plug 52 and the body 58 the plug 52 is disposed within the cavity 62 in the body 58. During the above-described downward movement of the plug 52 the ring 53 also descends with the plug 52 until the shoulder 54 presented by the ring 53 enters into resilient engagement with an unheated peripheral portion of the disc 26 bounding the opening provided in the ring 33. Thereafter continued downward movement of the plug 52 results of course in movement of the cross member 51 towards the ring 53 with compression of the springs 57.

The cavity 62 is connected through the pipe 63 to the source of vacuum thereby to cause the heated portion of the disc 26 within the bore 32 in the turntable 10 to be urged into contact with the sides of the cavity 62. Thus a cavity is formed in the central portion of the disc 26 by the action of the heated plug 52 on one face of the disc 26 and of a vacuum on the opposed face of the disc 26, the heat of the central portion of the disc 26 being maintained by the electrically heated plug 52 during the forming of the central portion of the disc 26. Thus the central portion of the disc forms the cavity and the unheated clamped peripheral portion forms the rim, of the formed cup-like container.

Figure 10:
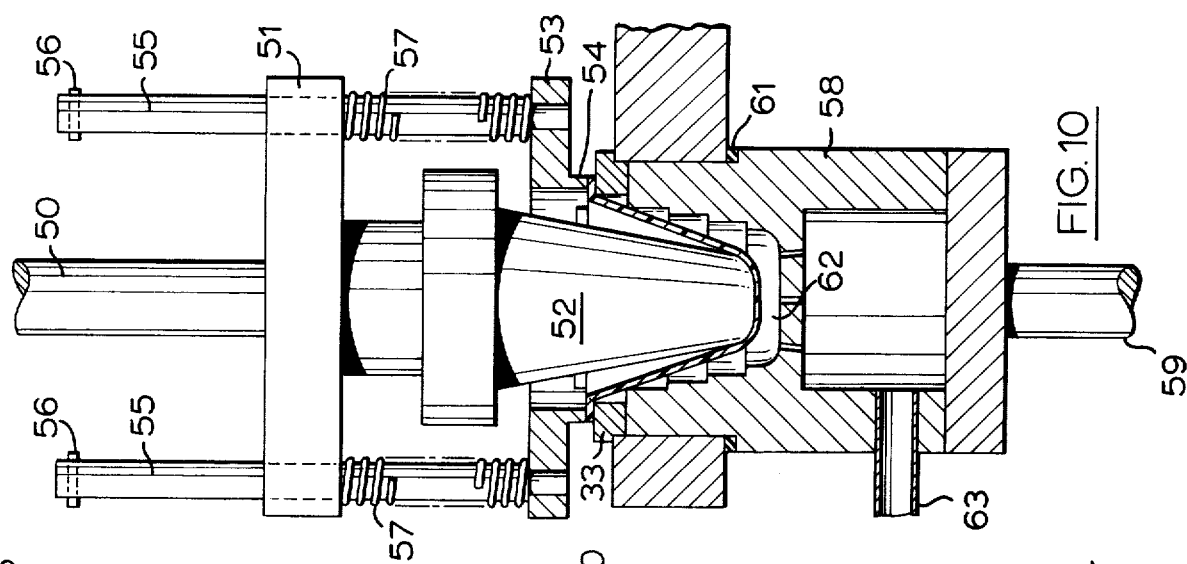
FIGS. 10 and 11 are views corresponding to FIG. 9 but showing said further portion of the apparatus illustrated therein in different operative conditions.
Figure 11:
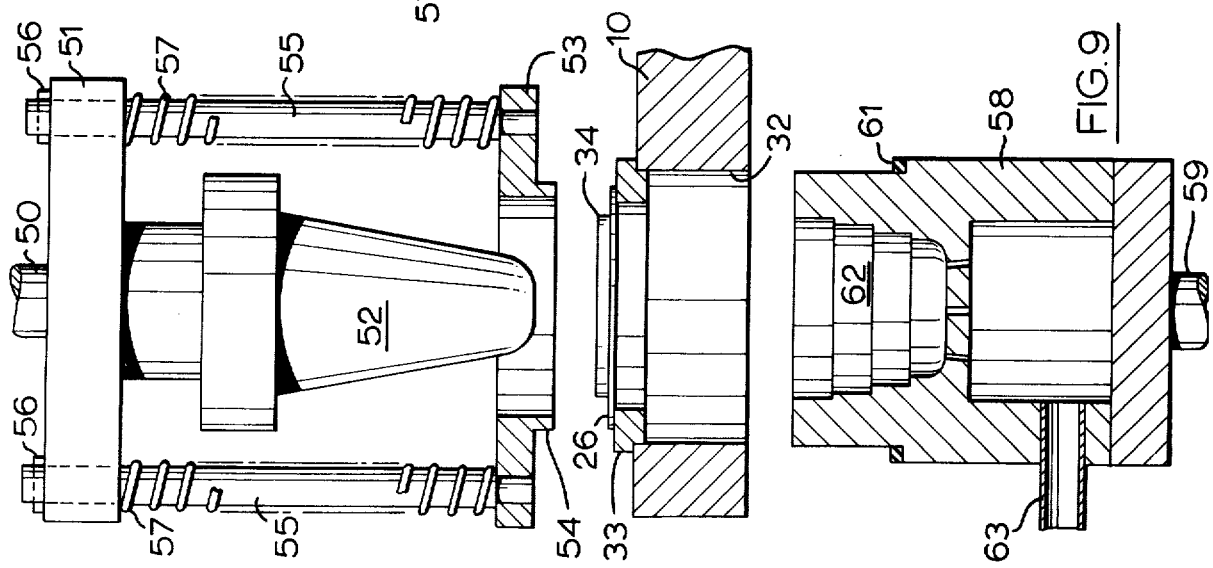
Figure 13:
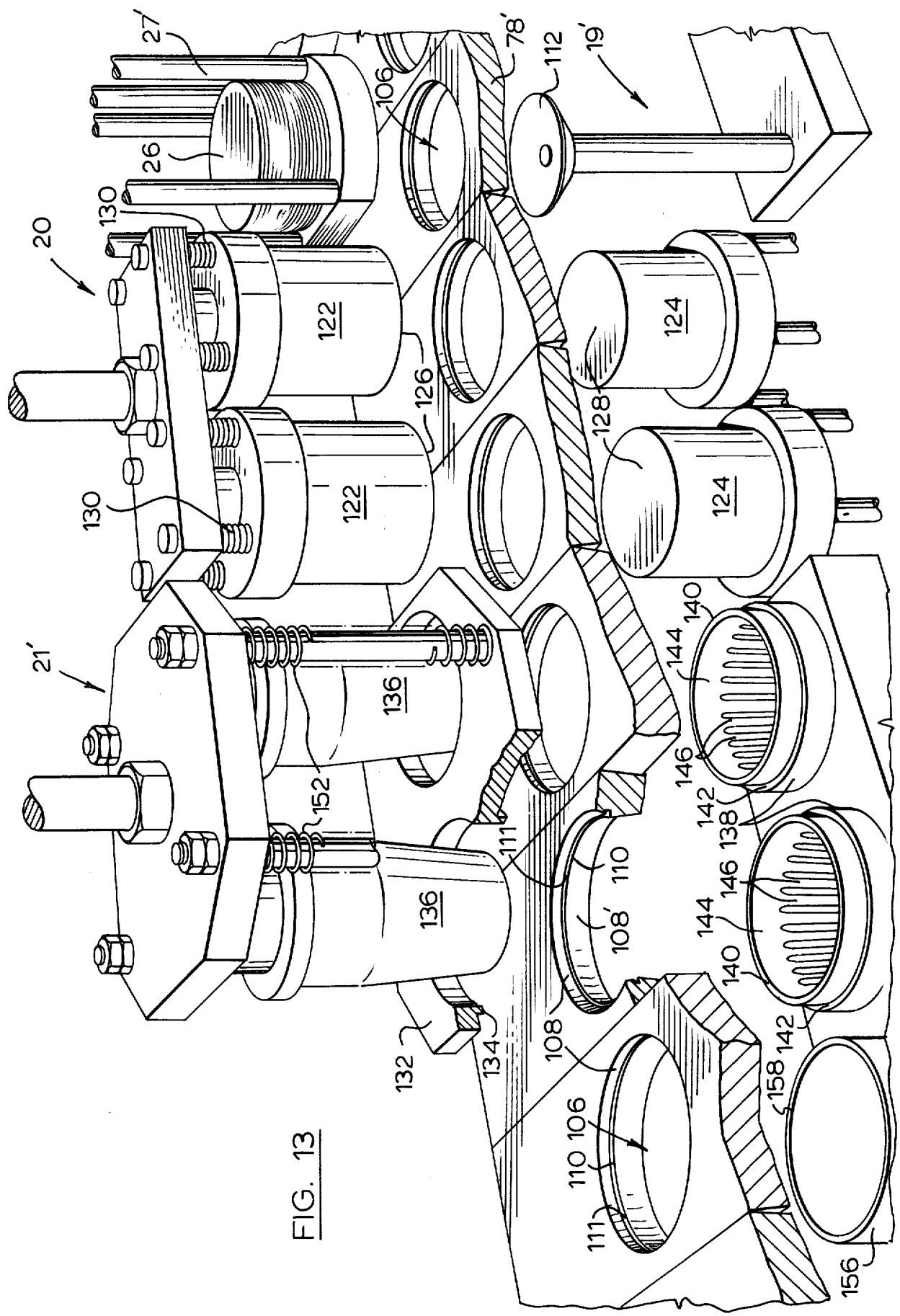
FIG. 13 is a partly broken away perspective view, drawn to an enlarged scale, of the apparatus of FIG. 12.

The shape and configuration of the resultant cavity of the container corresponds, of course to that of the cavity 62 which, as shown in FIGS. 9, 10 and 11, is of stepped form although it is to be emphasized that this is merely exemplary and other configurations may be provided, as for example, those seen in FIGS. 13 and 16. The shape and configuration of the cavities of the containers are in no way critical.

The product dispensing means 22 includes a pump 64 which is operatively driven through a rotor arm linkage 65 from, for example, the power means (not shown) for rotatable indexing of the turntable 10, the pump 64 having an inlet pipe 66 through which the product to be filled into the containers is operatively drawn and an outlet pipe 67 through which the product is discharged to a product dispensing head (not shown in FIG. 2) for dispensing into the containers. As will be appreciated, the product dispensing means 22 as hereinbefore described with reference to FIG. 2 is particularly adapted for the dispensing of a liquid product such as, for example, milk, cream, fruit juice and so on.

The mechanism 23 for applying a closure lid to each container comprises a drum 68 on which a coil 69 of interconnected closure lids is mounted, the closure lids being interconnected by, for example, frangible or severable tabs or the like. A feeding mechanism (not shown in FIG. 2) operatively feeds the free end of the coil 69 such that the closure lids are fed to the station 18 in synchronism with the rotatable indexing of the turntable 10. The mechanism 23 also includes electrically heated pads 70 which are vertically reciprocable from a position clear of the closure lids as they are fed to the station 17 to a position in which they heat seal the closure lids to the containers. As shown in FIG. 2 there are two pads 70, and thus unlike the embodiment hereinbefore described with reference to FIG. 1 in which there is only one station at which the closure lids are applied to the containers the form of apparatus shown in FIG. 2 incorporates two such stations, each closure lid being, at the first of said stations, partially sealed to the container and the tabs or the like connecting said lid to the next following lid being broken by knife means or the like (not shown in FIG. 2), and being, at the second of said stations, fully sealed to the container.

The discharge mechanism 24 comprises a guide track 71 consisting of two spaced guide rails 72 along which each product-filled container with a closure lid secured thereto is automatically discharged from the turntable 10 as the turntable 10 is rotatably indexed, the containers beings so discharged into, for example, a conveniently located receptacle 73 or the like.

It will be noted that unlike the embodiment shown in FIG. 1 there are in the form of the apparatus illustrated in FIG. 2 a number of "idle" stations 74 at which no process steps are performed.

As mentioned the heating of the central portions of the discs 26 prior to and during the forming of the central portions of the discs 26 into the cup-like containers raises the temperature thereof to a value, e.g. of the order of 280°F, at which any bacteria on the discs 26 is thereby killed. In this manner the cup-like containers are automatically sterilized prior to the dispensing of the product into the containers and the application of the closure lids thereto.

Figure 3:
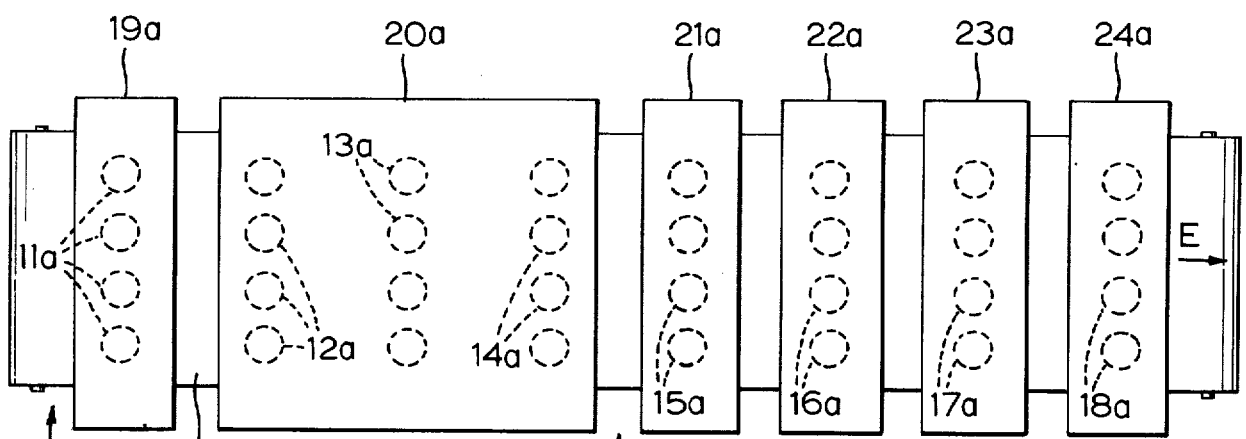
FIG. 3 is a diagrammatic view of apparatus according to a second preferred embodiment of the present invention.
Figure 4:
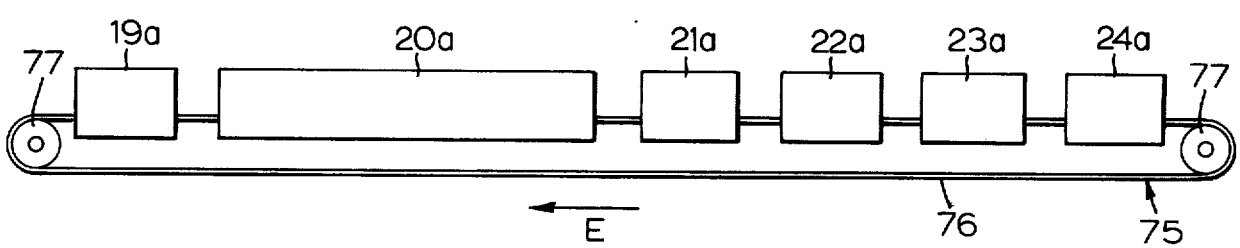
FIG. 4 is a diagrammatic view in the direction of the arrow A in FIG. 3 of the apparatus shown therein.

The second preferred embodiment shown in FIGS. 3, and 4 substantially corresponds to the first preferred embodiment hereinbefore described with particular reference to FIG. 1, and differs therefrom primarily only in that instead of the turntable 10 there is provided a conveyor 75 comprising an endless conveyor band 76 which is entrained around end rollers 77 and which is operatively driven by power means (not shown) in the direction of the arrows E for indexing of the conveyor band 76 in a manner substantially corresponding to the manner in which the turntable 10 is indexed in the first preferred embodiment as hereinbefore described. In this second preferred embodiment of the invention shown in FIGS. 3 and 4 each of the stations 11 to 18, inclusive, is constituted by four stations so that with the apparatus shown in FIGS. 3 and 4 four product-filled containers are simultaneously formed thereby quadruplicating the rate at which the product-filled containers are produced in comparison with the apparatus shown in FIG. 1, assuming of course, that the rate of indexing equals turntable 10. It is, of course, to be emphasized that in the second preferred embodiment shown in FIGS. 3 and 4 there could be more or fewer than four stations at each of the stations 11a to 18a, inclusive corresponding to stations 11 to 18 of FIG. 1.

It will also of course be understood that the conveyor band 76 requires to be indexed a plurality of times in order to return the portion of the band 76 at the stations 18 along the lower run of the belt 27 to the stations 11a.

Figure 5:
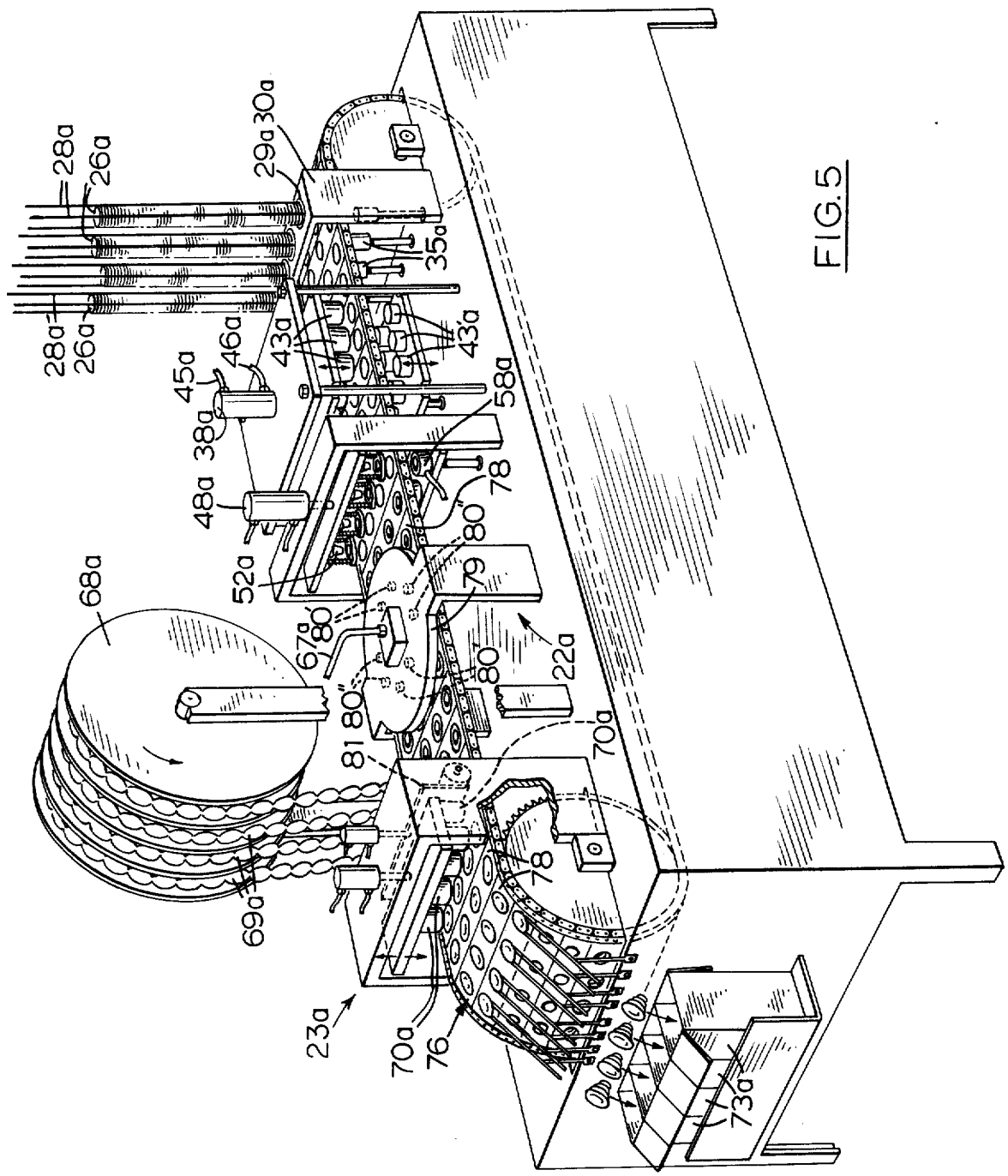
FIG. 5 is a perspective view of one form of apparatus generally according to the second preferred embodiment of the invention shown in FIGS. 3 and 4.

With particular reference to FIG. 5 which is a perspective view of one form of apparatus generally according to the preferred embodiment of the invention shown in FIGS. 3 and 4, the same reference numerals with an a added are used in FIG. 5 as in FIGS. 3 and 4 to denote the corresponding parts of the apparatus. Furthermore, except as is hereinafter noted, in the form of the apparatus shown in FIG. 5 the pick-up device 19a, the magazine associated therewith, the heating unit 20a, the clamping and forming device 21a, the product dispensing means 22a, the mechanism 23a, and the discharge mechanism 24a substantially correspond to four of the pick-up devices 19, four of the magazines 27, four of the heating units 20, four of the clamping and forming devices 21, four of the product dispensing means 22, four of the mechanism 23, and four of the discharge mechanisms 24 respectively, as hereinbefore specifically described with reference to FIGS. 2, 6, 6A, 7, 8, 9, 10 and 11, and corresponding elements thereof are accordingly denoted by corresponding reference numerals.

The conveyor band 76 comprises a plurality of transversely disposed plates 78 which are connected to roller chains (not shown), the rings represented by rings 33 in FIG. 6 for example which are mounted in the bores 32 in each of the plates 78 being secured therein to prevent the rings 33 inadvertently disengaging from the bores 32 along the lower rim of the band 76.

In FIG. 5 elements of the lower heating assembly of the heating unit 20a which are illustrated therein are denoted by the same reference numerals as the corresponding elements of the upper heating assembly except that these elements of the lower heating assembly are provided with prime marks.

In FIG. 5 the product dispensing head of the product dispensing means 22a comprises a disc-shaped member 79 provided with product dispensing nozzles 80 each of which dispenses only one half of the predetermined quantity of the product in question which is filled into each of the cup-like containers. The nozzles 80' operatively dispense the product into the containers of the two central rows thereof and the nozzles 80'' operatively dispense the product into the containers of the two outer rows thereof, the product filling of the containers being effected over a plurality of longitudinally spaced stations, with a fraction of the product to be dispensed into each container thus being so dispensed at each of a plurality of spaced stations.

In FIG. 5 the knife means which is incorporated in the closure mechanism 23a, and which serves to break the tabs or the like interconnecting the closure lids and the next following closure lids in the coils 69a is illustrated and denoted by the reference numeral 81.

Figure 12:
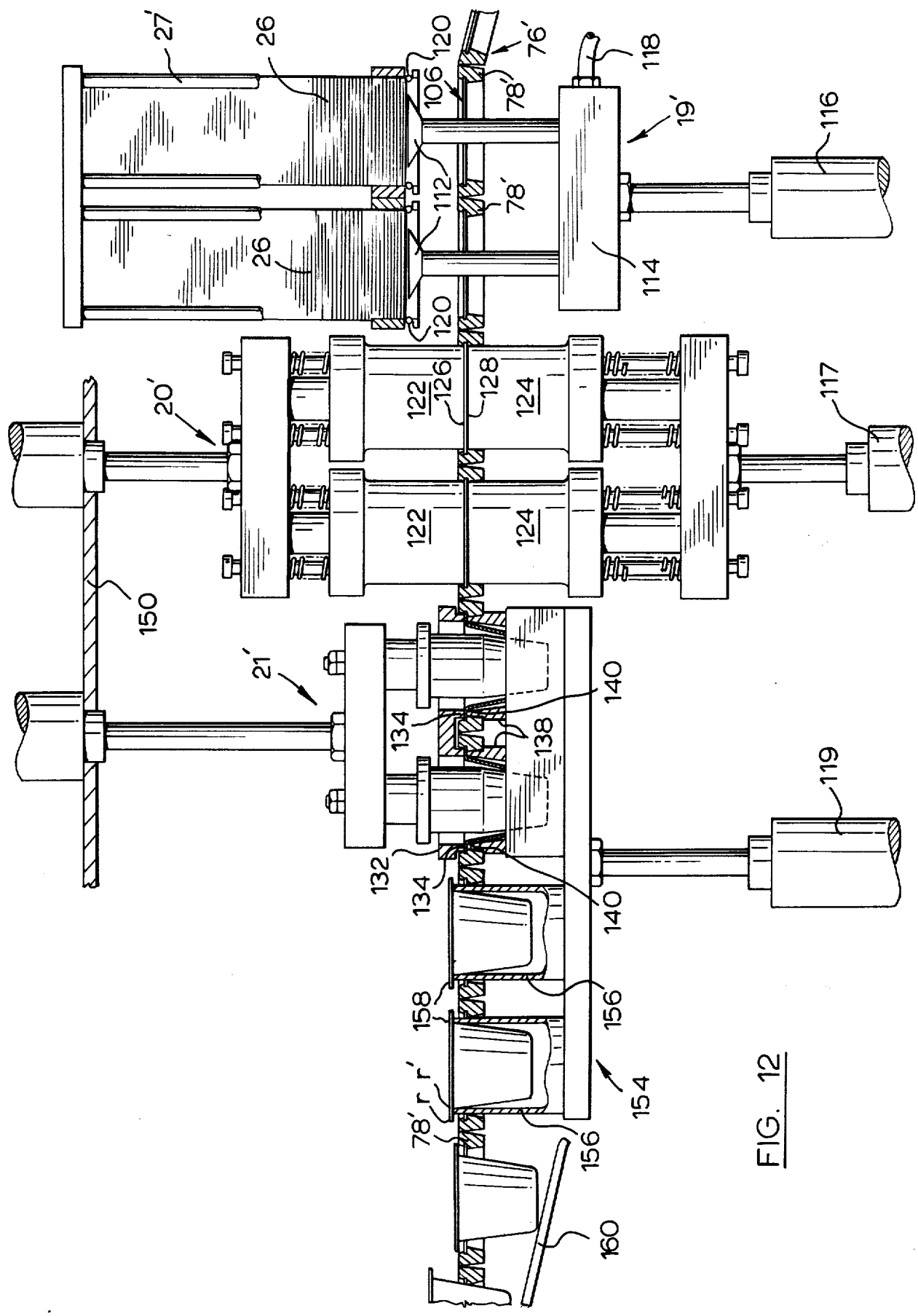
FIG. 12 is a part side elevational part vertical sectional view of alternative apparatus which may be employed at stations 11, 12-14 and 15 of the general apparatus of FIG. 3.

FIG. 12 illustrates alternative specific forms of pick-up, heating and clamping and forming apparatus 19', 20' and 21' for use at the pick-up, heating and clamping and forming stations (e.g. stations 11a, 12a –a, and 15a) of the general apparatus shown in FIGS. 3 and 4.

In this case again the conveyor 76' formed of transversely disposed plates 78' corresponding to the previously discussed conveyor 76 made up of the plates 78. Each of the plates 78' which is to constitute a translatable blank holder is provided with a plurality of annular bores 106 generally corresponding to the bores 32 of the previously described apparatus. It will be understood that the number of bores in the plates 78' will correspond to the number of parallel rows of feed desired in the conveyor.

Each of the bores 106 as best seen in FIG. 14 has an upper slightly inwardly tapered portion 108 which tapers to a diameter slightly smaller than the diameter of the disc 26. At the bottom of this bore portion 108 the plate is provided with an undercut or groove 111 into which the periphery of the disc is adapted to snap to fix the disc relative to the plate supported on the underside by a small ledge or shoulder 110. Below the shoulder or ledge 110 the bore continues through to the underside of the plate 78' and this bore portion 108' may have a slight reverse taper to the bore portion 108 as illustrated.

In the case of the apparatus of FIGS. 12 to 16, (FIGS. 13 to 16 illustrates details of the apparatus of FIG. 12) two blanks are adapted to be drawn, heated and formed simultaneously. Therefor, the magazine 27' is shown as a dual magazine containing two stacks of discs 26, for example for making cream receiving containers which may be of the order of 1⅝ inch in diameter and 0.020 inches in thickness formed of a suitable thermo plastic material, the discs at ambient room temperature being relatively hard and stiff but being capable of some measure of resilient flexing. Thus when the suction cups 112 carried by the cross arm 114 operated by the air cylinder 116 of the pick-up device 19' has contacted the undersides of the lower most discs, and suction applied to the cups through the air line 118, and the suction cups have commenced downward movement the central portions of the discs will be pulled or flexed downwardly reducing the disc diameters and allowing them to pass the retaining O - rings 120. Similarly as the suction cups 112 move down through the bores 106 the central portions of the discs 26 will flex downwardly reducing the disc diameters and allowing them to move through the tapered bore portion 108 until the discs are released by the suction cups with their peripheries in registration with the grooves 111. At this point the discs snap back to their planar configuration and snap into the grooves 111 to be locked thereby against movement relative to the plates 78'.

The discs 26, after positioning, by pick-up device 19', is indexably moved in the direction of arrow F in FIG. 12, and positioned under heating unit 20' between pairs of upper and lower heating elements 122 and 124 having heating faces 126 and 128 for contacting under resilient pressure and heating opposite faces of the discs out to adjacent the peripheries thereof to a temperature at which the heated portion is formable.

In, for example, the packaging of cream it is desired that the finished container present a flat outer rim portion of the order of at least about 1/16 of an inch against which the closure may be sealed and a total rim width of the order of ⅛ inch to provide the rigidity in the finished container to enable it to stand up to handling without collapsing when filled with cream or the like. In addition, to provide requisite capacity in the finished container it is desirable that the draw obtained in the forming operation closely approaching the diameter of the container at the inside of the rim, (e.g. with a blank of the order of 1⅝ inch, a rim of about     inch and an inner diameter of about 1⅜ inch the draw should approach about 1 3/16 inches). To accomplish this deep draw it is essential that the heated portion of the disc 26 should be uniformly heated so that the container cavity wall can be formed of uniform thickness in the forming operation as otherwise the flow of material would not be uniform and the cavity wall thickness would vary and at some point become too thin for handling and would rupture. Accordingly, the heated faces 126 and 128 of the heating elements 122 and 124 contact each of the discs 26 under the resilient pressure of the springs 130 (see FIG. 13) out to about within 1/16 inch of the periphery so that out to this point the central portion of the disc is uniformly heated while the remaining 1/16 inch of the periphery is left cold to retain its rigidity so that it can support the central heated portion during the forming operation and also form the flat rigid outer rim portion required to provide the peripheral closure sealing area.

By maintaining the heating faces 126 and 128 at a temperature of the order of 300° to 350°F the pressure contacted portion of the disc 26 therebetween can be raised quickly and uniformly to least about 280°F at which temperature bacteria present is destroyed and the material becomes readily formable.

Following heating the two discs 26 are subsequently indexably positioned below forming unit 21' having a spring loaded clamping plate 132 provided with a pair of depending clamping shoulders or rings 134. Operating through openings in the plate 132 are two forming plugs 136, such devices seen best in FIGS. 14, 15 and 16. Below the conveyor 76' are a pair of appropriate cavity molds or bodies 138 corresponding to the body 58 (FIGS. 9 and 10) and these cavity molds are each provided with a reduced upper shoulder 140 which is adapted to enter the lower bore portion 108' and form with the ledge 110 an under rim support during the molding operation. The mold is also provided with a lower stop shoulder 142 which is adapted to abut the underside of the conveyor plate 78' to locate rim support shoulder 140. The mold cavity 144 is also preferably provided with a plurality of inwardly projecting ribs 146 for providing reinforcing ribs or corrugations 141 on the container cavity wall. Leading from the mold cavity 144 are passages 148 connected to a suitable suction device (not shown). It will be understood that the heating unit 20' and the forming unit 21' will be operated in suitably timed relation to the conveyor indexing so that the cross head 150 will be moved downwardly and the lower heating elements 124 and cavity molds 138 simultaneously moved upwardly, e.g. by appropriate air cylinders 117 and 119 so that while the heating elements are heating a pair of discs at the heating position, the clamping rings 134 under pressure of the springs 152 and the supporting shoulders 140 together with the undercuts 111 will support both the outer 1/16 inch unheated and inner 1/16 inch heated peripheral portion of a previously heated pair of discs. Thereafter, the forming plugs 136 which are heated at least to about the temperature of the heated portions of the discs to prevent cooling thereof are moved downwardly through the clamping plate openings and into the cavity molds 138. At the same time suction is applied to the molds and the uniformly heated disc portions are displaced and flow into conformity with the mold cavities to provide a substantially uniform cavity wall thickness e.g. of the order of 0.008 to 0.010 inches throughout. During this operation the inner heated portion of each of the disc peripheries which are held against the support shoulder 140 by the clamp ring 134 provides a small reservoir of flowable material which can be drawn down into the cavity to ensure an integerity, continuity and appropriate thickness of the container wall at the juncture of the rim and cavity. The flow of material from this area provides a slight thinning of the inner portion of the rim indicated at r', FIG. 15 but the outer peripheral portion of the disc r which was not heated retains its original thickness and remains rigid, smooth, and flat not only affording the appropriate support for the disc during the forming operation so it is not pulled out of the undercut or groove 111 but also providing the accurate sealing surface required in the sealing of the closure operation.

For ejecting the heat formed containers from grooves 111, discharge mechanism 154 is provided to reciprocate simultaneously with molds 138 and comprises a pair of annular collars 156 having an outer diameter slightly less than the internal diameter of bore 106 adjacent ledge 110, but having their upper rims 158 move above the grooves 111 when the molds 138 are moved to the molding position. Therefore, after a pair of containers are formed and indexed to their next subsequent position above collars 156, as the molds 138 are raised to seat in bores 106 against the underside of a preceding disc to be clamped and formed, annular collars 156 force upwardly on the rim portions r' of the formed containers to flex same and snap rim portions r out of the undercuts 111 and out of the upper bore portions 108 (see FIG. 12). The container may subsequently be filled and closed prior to ascending ramp 160 or may be indexably moved to ascend ramp 160 to be subsequently filled and sealed.

Figure 17:
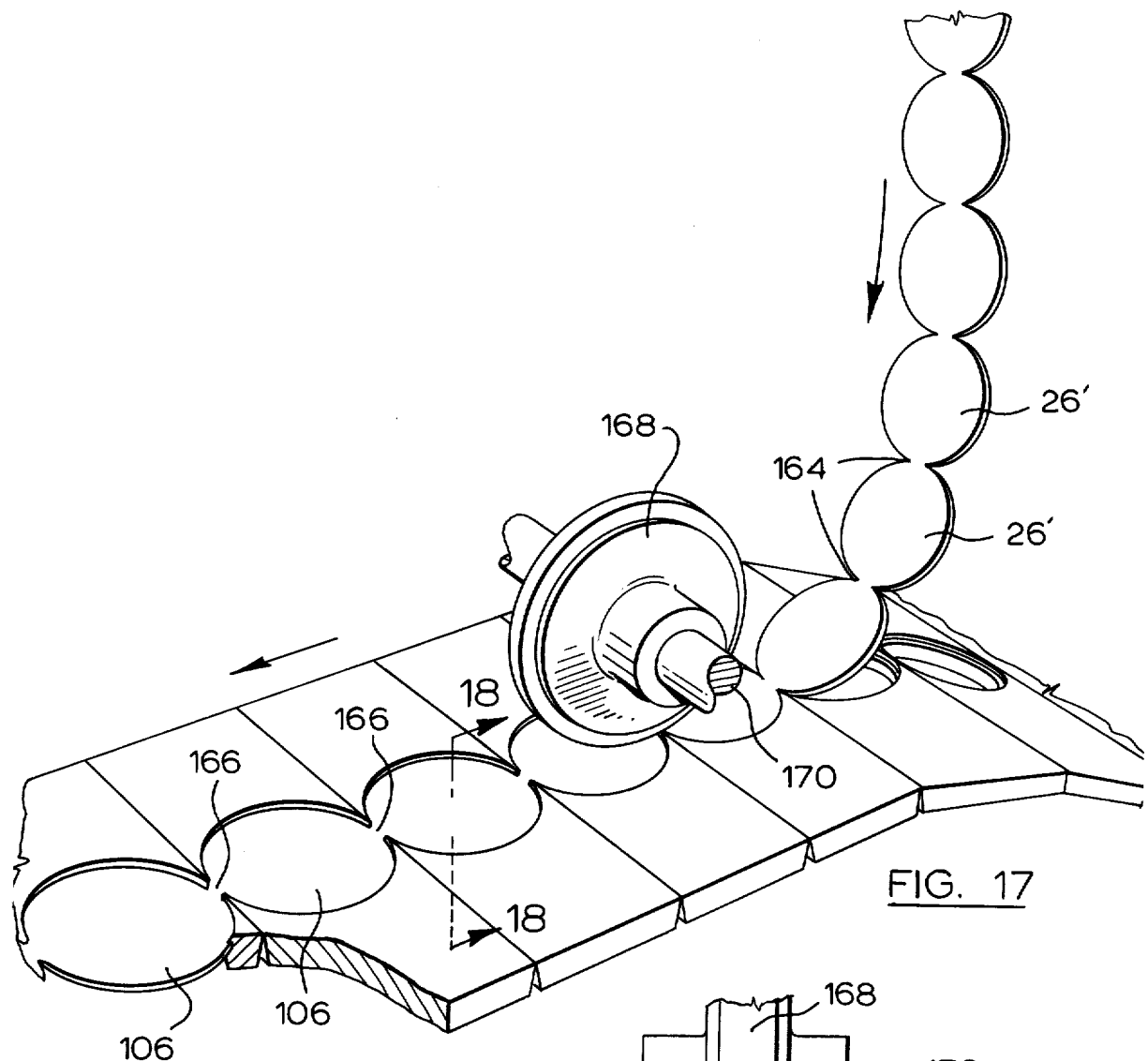
FIG. 17 is a perspective view, drawn to an enlarged scale, of an alternative form of blank feed for use at station 11 of the general apparatus of FIG. 3.
Figure 18:
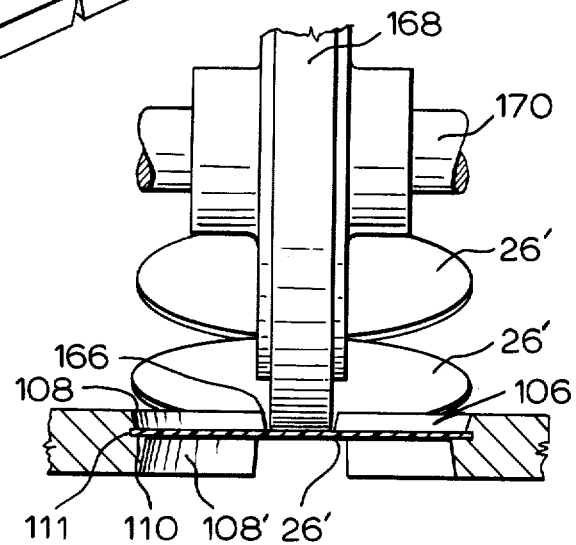
FIG. 18 is a cross-sectional view of FIG. 17 taken along the line 18-18 in FIG. 17 and looking in the direction of the arrows.

FIGS. 17 and 18 relate to a blank feeding device in which the pick-up device 19 and magazine 27 are replaced by a series of thermo plastic discs 26' interconnected by webs 164 of the same material and which, for example, may be supplied in suitable rolls. The discs are fed in synchronism with the indexing of the endless conveyor 76' so that discs are consecutively presented in alignment with a bore 106 to partially seat in each bore 106 as the plates of the conveyor are indexed. Web receiving slots 166, on diametrically opposed sides of each bore 106, receive the webs 164 interconnecting adjacent discs and roller 168 journaled for rotation about rod 170, and in registration with the web receiving slots 166 (seen best in FIG. 18) forces the attached discs and webs into the bores and web slots respectively.

Therefore, as each disc is positioned in the bore, each web overlies a slot 166 in the conveyor plate or disc holder 78'. Roller 168 aligned to ride down the slots and central portion of each disc 26, exerts a downward force on the discs to snap the discs into the bore and forcing the disc into the undercut 111. The positioned discs are subsequently acted upon as previously and the webs 164 are subsequently severed, as for example, by a knife.

While as hereinbefore described with reference to the accompanying drawings the turntable 10 and the conveyor band 76 or 76' remain stationary at each station during the performing of the appropriate process steps it is to be understood that the turntable 10 may be continuously rotatable and the conveyor bands 76 or 76' may be continuously movable in which case the pick-up device, e.g. 19, the heating unit, e.g. 20, the clamping and forming device, e.g. 21, the product dispensing means, e.g. 22, the closure mechanism, e.g. 23, and the discharge mechanisms, e.g. 24 are movable during the performing of the appropriate process steps thereby in the same direction and at the same speed as the respective stations on the turntable 10 or the conveyor band so that there is substantially no relative movement therebetween.

It will, furthermore, be understood that if the containers are subsequently filled, instead of the closure lids being heat sealed to the product-filled containers by the closure mechanism 23 the closure lids could be, for example, crimped or snapped on to the containers by this mechanism 23.

Since the space occupied by a plurality of the tablet-like slips or blanks or rolls of blanks of formable material as employed in carrying out the invention is substantially less, and may be of the order of 10 to 20 times less, than the space occupied by a corresponding plurality of cup-like containers even when the containers are disposed in stacked relationship, it will be understood that the use of the invention provides for a substantial reduction in the shipping costs involved in transporting a plurality of these tablet-like slips or blanks or rolls to a plant in which the blanks are formed into cup-like containers immediately prior to filling as compared with the shipping costs involved in transporting a corresponding plurality of finished cup-like containers. Likewise, since a magazine from which the tablet-like slips, blanks or discs of formable material are operatively supplied to the station or stations 11 may contain a substantially larger number of these blanks or a roll of blanks than the number of cup-like containers which could be contained in a magazine of corresponding dimensions, it follows that according to the present invention there is a substantial reduction in the frequency with which the magazine requires to be replenished with a resultant reduction in the labor costs involved.

It will be also understood that by making and sterilizing the containers immediately preparatory to filling and sealing the invention provides for an aseptic container without the requirement of any sterilizing operation other than the actual forming of the container.

As many changes can be made with respect to the various components of the apparatus and the process carried out thereby, it is intended that the above description be merely exemplary of preferred embodiments and not be construed in a limiting sense.

I claim:

1. Apparatus for producing an individual rimmed plastic container preparatory to the filling and closing thereof from a relatively stiff resilient blank of predetermined shape formed entirely of heat formable material which is essentially rigid at normal ambient temperatures comprising means for supporting a supply of blanks, a rigid blank holder mounted for translating movement and means for translating same, said holder having an opening therethrough corresponding to the shape of but slightly smaller than said blank and presenting a support ledge therearound, means for delivering a blank from a supply supported on said support means and seating the outermost peripheral portion of said blank on said support ledge at a first position of said holder, said holder having means for engaging said outermost peripheral blank portion to preclude movement thereof relative to said holder, means at a second position of said holder displaced from said first position for uniformly heating the blank portion bridging said holder opening to a formable temperature while leaving said seated outermost peripheral blank portion rigid, means at a third position of said holder displaced from said second position for clamping a heated peripheral portion of the blank immediately adjacent to said seated rigid outermost peripheral portion against movement out of the plane of said outermost rigid peripheral portion and further means at said third holder position for forming a cavity from the heated blank portion within said clamped peripheral portion while same remains clamped.

2. Apparatus as claimed in claim 1 in which said means for uniformly heating the blank portion bridging the holder opening comprises a pair of heater elements mounted for movement towards and from said bridging blank portion and having planar heating surfaces adapted to contact said bridging blank portion on opposite sides thereof, and means for resiliently pressing said planar heating surfaces against said bridging blank portion while heating same.

3. Apparatus as claimed in claim 2 in which the wall of said opening through said holder has a peripheral groove therein intermediate the depth of the opening, said groove being adapted to receive said outermost peripheral portion of said blank after the central portion of said blank has been flexed out of the plane of said outermost peripheral portion to reduce the dimensions thereof sufficiently to permit said blank to enter said opening to bring said outermost peripheral portion into registration with said groove and said blank delivering means constitutes means to flex said blank as aforesaid and force same into said opening to bring said outermost peripheral portion into registration with said groove whereupon said blank snaps back towards its planar configuration to seat outermost portion in said groove.

4. Apparatus as claimed in claim 3 in which means are provided to engage the portion of the rim formed as a result of the forming of said cavity and constituted by the clamped blank peripheral portion immediately adjacent to said outermost peripheral blank portion to resiliently distort said rim and snap same out of said groove and opening to discharge the container.

5. Apparatus for producing an individual rimmed plastic container preparatory to the filling and closing thereof from a relatively stiff resilient blank of predetermined shape formed entirely of heat formable material which is essentially rigid at normal ambient temperatures comprising means for supporting a supply of blanks, a blank holder adapted to receive and carry a blank from a pick-up location through a heating location, and a forming location, and means for moving said holder, said holder having an opening formed therethrough of a shape corresponding to but slightly smaller than the shape of said blank and presenting a seating ledge on which the outermost peripheral portion of said blank is adapted to seat, means for delivering a blank from a supply supported on said support means to said holder at said pick-up location to seat same on said seating ledge, means provided on said holder to secure said blank in seated relation after delivery thereto and while said holder is being moved from location to location, a pair of heaters associated with said heating location and presenting a pair of planar heating surfaces adapted to be brought when said blank is moved to said heating location into contact with opposite sides of the portion of said blank bridging said seating ledge to heat same uniformly to a formable temperature while leaving said outermost peripheral blank portion rigid, means for applying resilient pressure to ensure intimate contact between said planar heating surfaces and said bridging blank portion during the heating thereof, and means associated with said forming location for forming said heated blank portion into a cavity when said heated blank is moved to said forming location to produce a rimmed container.

6. Apparatus as claimed in claim 5 in which means associated with said forming location are provided to support a narrow heated peripheral blank portion immediately adjacent to said outermost rigid peripheral blank portion in the plane of said rigid peripheral portion during the forming of said cavity to provide a peripheral reservoir of formable material to be necked down into the cavity during the forming thereof.

7. Apparatus as claimed in claim 6 in which said forming means comprises a heated plug for engaging and displacing the heated blank portion from one side thereof and a suction cavity adapted to be brought into operative relation with the other side of said heated blank portion.

8. Apparatus for producing an individual rimmed plastic container from a relatively stiff resilient blank of predetermined shape formed entirely of heat formable material which is essentially rigid at normal ambient temperatures, then filling and closing said container comprising means for supporting a supply of blanks, a rigid blank holder mounted for translating movement and means for translating same, said holder having an opening therethrough corresponding to the shape of but slightly smaller than said blank and presenting a support ledge therearound, means for delivering a blank from a supply supported on said support means and seating the outermost peripheral portion of said blank on said support ledge at a first position, said holder having means for engaging said outermost peripheral blank portion to preclude movement thereof relative to said holder, means at a second position of said holder displaced from said first position for uniformly heating the blank portion bridging said holder opening to a formable temperature while leaving said seated outermost peripheral blank portion rigid, means at a third position of said holder displaced from said second position for clamping a peripheral heated portion of the blank immediately adjacent to said seated rigid outermost peripheral portion against movement out of the plane of said outermost rigid peripheral portion, means at said third holder position for forming a cavity from the heated blank portion within said clamped peripheral portion while same remains clamped to produce a container, means for introducing a desired product into said cavity, subsequently to the forming thereof, and means for sealing a closure to said outermost rigid peripheral portion subsequent to the introduction of said product into said cavity.

9. Apparatus as claimed in claim 8 in which said means for uniformly heating the blank portion bridging the holder opening comprises a pair of heater elements mounted for movement towards and from said bridging blank portion and having planar heating surfaces adapted to contact said bridging blank portion on opposite sides thereof, and means for resiliently pressing said planar heating surfaces against said bridging blank portion while heating same.

10. Apparatus as claimed in claim 9 in which the wall of said opening through said holder has a peripheral groove therein intermediate the depth of the opening, said groove being adapted to receive said outermost peripheral portion of said blank after the central portion of said blank has been flexed out of the plane of said outermost peripheral portion to reduce the dimensions thereof sufficiently to permit said blank to enter said opening to bring said outermost peripheral portion into registration with said groove, and said blank delivering means constitutes means to flex said blank as aforesaid and force same into said opening to bring said outermost peripheral portion into registration with said groove whereupon said blank snaps back towards its planar configuration to seat said outermost portion in said groove.

11. Apparatus as claimed in claim 10 in which means are provided to engage the portion of the rim formed as a result of the forming of said cavity and constituted by the clamped blank peripheral portion immediately adjacent to said outermost peripheral blank portion to resiliently distort said rim and snap same out of said groove and opening to release the container prior to the filling of the cavity thereof.

12. Apparatus for producing an individual rimmed plastic container from a relatively stiff resilient blank of predetermined shape formed entirely of heat formable material which is essentially rigid at normal ambient temperatures then filling and closing said container comprising means for supporting a supply of blanks, a blank holder adapted to receive and carry a blank from a pick-up location through a heating location, and a forming location, and means for moving said holder, said holder having an opening formed therethrough of a shape corresponding to but slightly smaller than the shape of said blank and presenting a seating ledge on which the outermost peripheral portion of said blank is adapted to seat, means for delivering a blank from a supply supported on said support means to said holder at said pick-up location to seat same on said seating ledge, means provided on said holder to secure said blank in seated relation after delivery thereto and while said holder is being moved from location to location, a pair of heaters associated with said heating location and presenting a pair of planar heating surfaces adapted to be brought, when said blank is moved to said heating location, into contact with opposite sides of the portion of said blank bridging said seating ledge to heat same uniformly to a formable temperature while leaving said outermost peripheral blank portion rigid, means for applying resilient pressure to ensure intimate contact between said planar heating surfaces and said bridging blank portion during the heating thereof, means associated with said forming location for forming said heated blank portion into a cavity when said heated blank is moved to said forming location to produce a rimmed container, means for subsequently introducing a product into the cavity of said container, and means for securing a closure to the rim of said container.

13. Apparatus as claimed in claim 12 in which means associated with said forming location are provided to support a narrow heated peripheral blank portion immediately adjacent to said outermost rigid peripheral blank portion in the plane of said rigid peripheral portion during the forming of said cavity to provide a peripheral reservoir of formable material to be necked down into the cavity during the forming thereof to ensure a substantially uniform cavity wall thickness and continuity between said cavity wall and the container rim.

14. Apparatus as claimed in claim 13 in which the product introduced into said cavity is a food stuff and said planar heating surfaces contact said bridging blank portion at a temperature and time to raise said bridging blank portion to a sterilizing temperature.

15. Apparatus as claimed in claim 14 in which said planar heating surfaces are maintained at a temperature of from about 300°F to 350°F and in contact with said bridging blank portion for a time sufficient to raise the temperature thereof to at least about 280°F.

* * * * *